US010929746B2

(12) United States Patent
Litvak et al.

(10) Patent No.: US 10,929,746 B2
(45) Date of Patent: Feb. 23, 2021

(54) LOW-POWER HARDWARE ACCELERATION METHOD AND SYSTEM FOR CONVOLUTION NEURAL NETWORK COMPUTATION

(71) Applicant: SAMSUNG ELECTRONICS CO., LTD., Suwon-si (KR)

(72) Inventors: Shai Litvak, Beit Hashmonaee (IL); Oded Ilan-Lipowsky, Tel Aviv (IL); Evgeny Soloveichik, Netanya (IL); Nir Zoran, Ramat Gan (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 540 days.

(21) Appl. No.: 15/823,091

(22) Filed: Nov. 27, 2017

(65) Prior Publication Data

US 2019/0164043 A1    May 30, 2019

(51) Int. Cl.
*G06F 7/544*    (2006.01)
*G06N 3/063*    (2006.01)
*G06F 1/03*    (2006.01)
*G06N 3/04*    (2006.01)

(52) U.S. Cl.
CPC ............. *G06N 3/063* (2013.01); *G06F 1/03* (2013.01); *G06F 7/5443* (2013.01); *G06N 3/0454* (2013.01)

(58) Field of Classification Search
CPC .............................. G06F 7/5443; G06F 17/15
See application file for complete search history.

(56) References Cited

U.S. PATENT DOCUMENTS

| | | | | |
|---|---|---|---|---|
| 2017/0323197 | A1* | 11/2017 | Gibson | G06N 3/063 |
| 2018/0129935 | A1* | 5/2018 | Kim | G06N 3/082 |
| 2019/0095782 | A1* | 3/2019 | Song | G06F 7/5443 |
| 2019/0138567 | A1* | 5/2019 | Martin | G06N 3/063 |

OTHER PUBLICATIONS

Miyashita et al., "Convolutional Neural Networks using Logarithmic Data Representation", 10 pages. (Year: 2016).*

(Continued)

*Primary Examiner* — Chuong D Ngo
(74) *Attorney, Agent, or Firm* — F. Chau & Associates, LLC

(57) ABSTRACT

A method of processing a layer in a convolutional neural network includes reading a plurality of different subsets of pairs of input vector values and corresponding weight vector values from an on-chip memory, storing the pair values in registers of a plurality of multiplication units, simultaneously processing the different subsets of pairs of values in the registers by multiplying the pairs of values and accumulating the results of the multiplications to obtain an output vector for a current layer. The input vector and the weight vector have floating point values and multiplying the pairs of values comprises adding corresponding pairs of integers in a log domain, and an input value or weight value is released from the on-chip memory after said input value or weight value is no longer needed for calculating non-computed output vector values.

15 Claims, 7 Drawing Sheets

(56) References Cited

OTHER PUBLICATIONS

Vincent Vanhoucke, et al., "Improving the speed of neural networks on CUPs," In Proc. Deep Learning and Unsupervised Feature Learning NIPS Workshop., (2011) http://research.google.com/pubs/archive/37631.pdf.
Jiuxiang Gu, et al., "Recent Advances in Convolutional Neural Networks," https://arxiv.org/abs/1512.07108v6, pp. 1-38, Jan. 2017.
David Stutz, Seminar Report—Understanding Convolutional Neural Networks http://davidstutz.de/wordpress/wp-content/uploads/2014/07/seminar.pdf.
Alex Krizhevsky, et al., "ImageNet Classification with Deep Convolutional Neural Networks," NIPS 2012, In Advances in Neural Information Processing Systems, pp. 1-9.
Christian Szegedy, et al., "Going Deeper with Convolutions," In IEEE Computer Vision and Pettern Recognition (CVPR), Boston, USA, 2015.; pp. 1-12 https://arxiv.org/abs/1409.4842.

\* cited by examiner

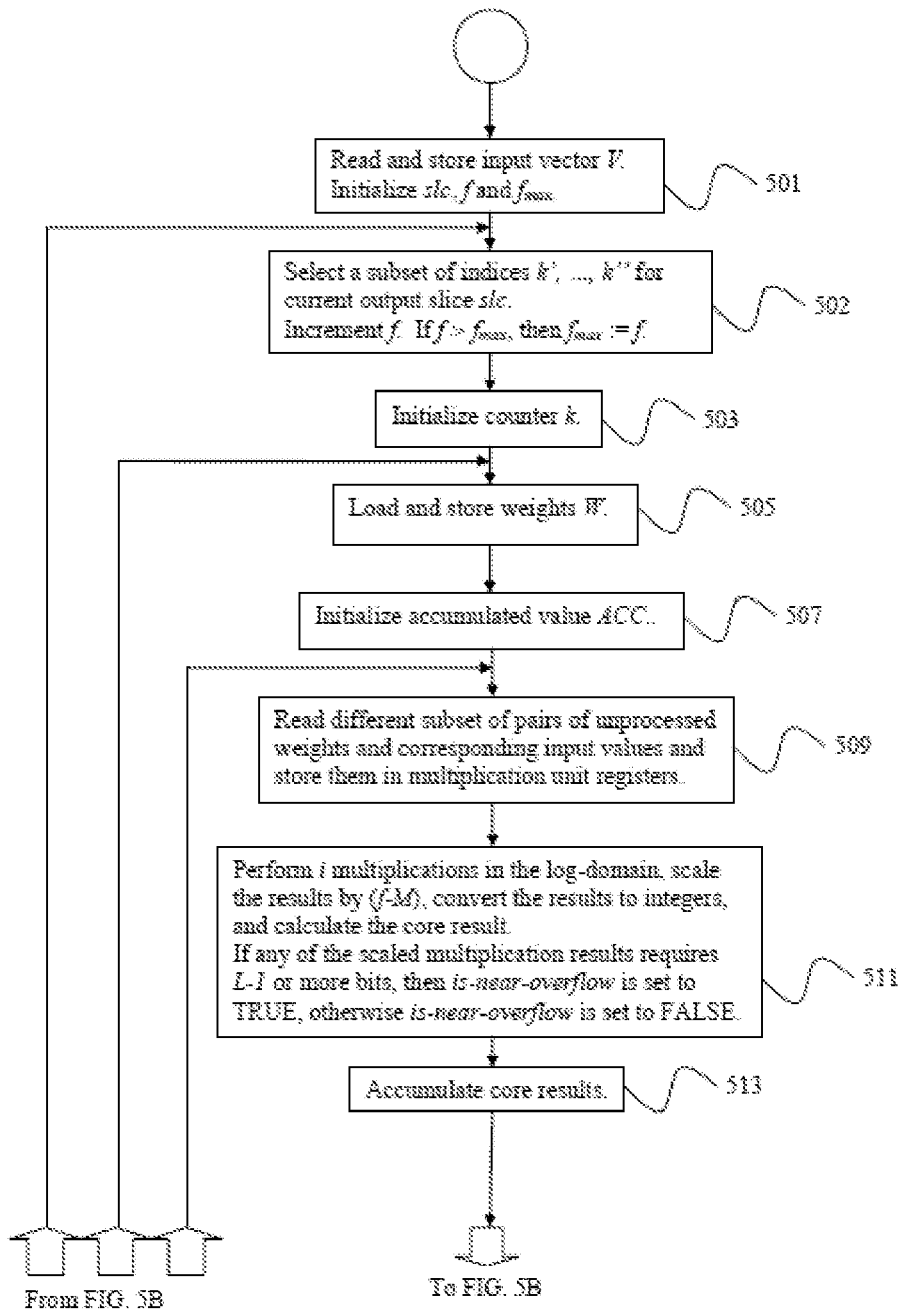

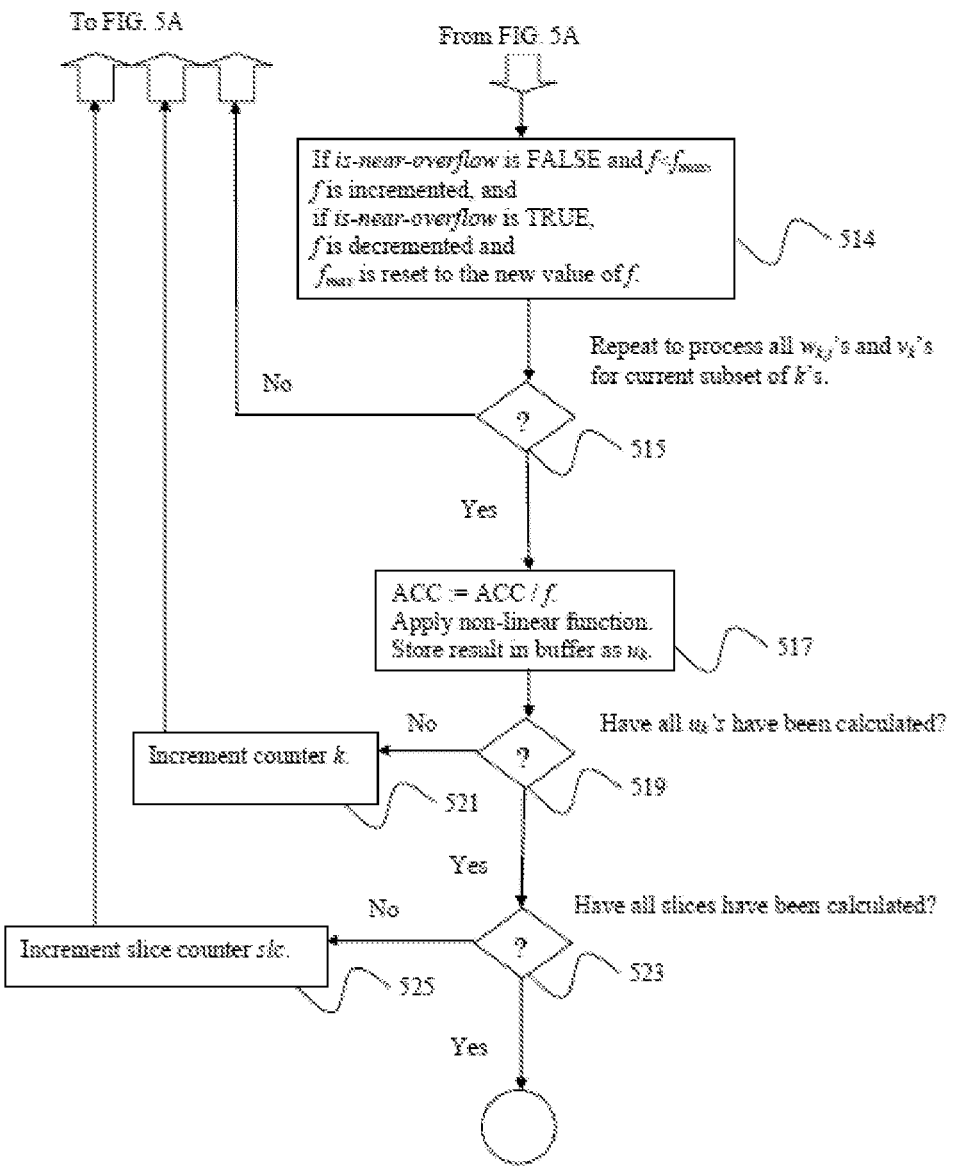

LOW-POWER HARDWARE ACCELERATION METHOD AND SYSTEM FOR CONVOLUTION NEURAL NETWORK COMPUTATION

BACKGROUND

1. Technical Field

Embodiments of the present disclosure are directed to methods of using convolutional neural networks, and hardware realizations of the same.

2. Discussion of the Related Art

Neural-Networks (NN) and specifically convolution-neural-network (CNN) are useful computation models for many advanced algorithms and applications, including recognition and segmentation of objects in images, face recognition, speech recognition, optical character and handwriting recognition, depth extraction from stereo images, automatic translation, etc.

NN's are typically highly computationally intensive. When many activations of a NN are required, e.g. for on-line, real-time object-detection and object-segmentation of a video at 30 or 60 frames per second, the computation load can become very high, e.g. up to several tera operations per second. To support such a load, a dedicated digital circuit for accelerating NN computation is useful. Intense computation also consumes significant power, which becomes a major factor in some contexts, such as mobile devices operating on battery power.

Traditionally, NN computations were implemented on standard general purpose digital hardware such as CPUs and GPUs that process high accuracy (e.g. 32-bit) floating-point values. However, it has been recently shown that similar, but less demanding computations on values represented with lower accuracy (e.g. 16-bits or 8-bits fixed point integer representation), are sufficient for many real-world applications.

SUMMARY

Exemplary embodiments of the present disclosure are directed to a method and digital hardware device that accelerates the central computation of a convolutional neural network mathematical model while consuming low power and maintaining the required precision. Acceleration is achieved by multiple units that perform highly intensive dedicated NN computations by massive parallelization. Low power is achieved by a novel highly adaptive fixed point representation of numerical values and corresponding highly effective approximated NN computations over such values, whose accuracy is sufficient for many NN-based applications. The NN accelerator uses novel highly-adaptive fixed-point representation of values, and approximate operations over such representation and corresponding digital circuit implementation for automatically determining the optimal adaptive parameters of the representation of values during the NN computation. A NN accelerator according to embodiments of the disclosure avoids a digital unit for explicit multiplication traditionally used for NN computations, and instead uses novel low-power digital units, each combining a simple digital units including a lookup table, with few adders and few shifters. A digital circuit according to an embodiment has a small footprint on the circuit in terms of logical gates per operation, by optimizing the utilization of the available digital arithmetic units, and can parametrically control the tradeoff between power and accuracy of the computations without changing the circuit.

According to an embodiment of the disclosure, there is provided a method of processing a layer in a convolutional neural network, including reading a plurality of different subsets of pairs of input vector values and corresponding weight vector values from an on-chip memory, storing the pair values in registers of a plurality of multiplication units, simultaneously processing the different subsets of pairs of values in the registers by multiplying the pairs of values, and accumulating the results of the multiplications to obtain an output vector for a current layer. The input vector and die weight vector have floating point values and multiplying the pairs of values comprises adding corresponding pairs of integers in a log domain, and an input value or weight value is released from die on-chip memory after the input value or weight value is no longer needed for calculating non-computed output vector values.

According to a further embodiment of the disclosure, a base of the log domain is $2^{\wedge}(1/(2^{\wedge}N))$, where N is a positive integer.

According to a further embodiment of the disclosure, the method includes, for each layer of the convolutional neural network, storing log domain values of the input vector in the on-chip memory, storing log-domain values of the weight vector in the on-chip memory, converting the integer addition results back to a linear domain, before accumulating the multiplication results, and outputting the output vector for die layer from the on-chip memory to an external memory.

According to a further embodiment of the disclosure, multiplying die pairs of values by adding corresponding pairs of integers in a log domain includes calculating $y=[s/R]$ where $R=2^N$ and s is sum of a corresponding pairs of integers by right shifting s by N bit, calculating s % R by extracting the N least significant bits of s, where s % R is in a range [0, R−1], mapping s % R to a positive number x in a range [1, 2) using a look-up-table, and left shifting x by y bits to calculate $2^{\lfloor s/R \rfloor} \times 2^{(s\ \%\ R)/R}$.

According to a further embodiment of the disclosure, calculating a multiply-and-accumulate operation includes calculating, for a $u_k$ for some k, $c_{d,k} \Sigma_{j \in \Psi(d,k)} v_{\Omega(j,k)} \times w_{k,j}$, where $u_k$ is the output vector, $v_j$ is an input vector and $w_{k,j}$ is a corresponding weight, $\Psi(d, k)$ is a set of i indices selected for iteration d of calculating $u_k$, and that the union over all iterations d is simply the entire set of indices 1, . . . J, and $\Omega(j, k)$ is a subset of the inputs $\Omega(1, k), \ldots, \Omega(j, k)$ used for calculating each output value $u_k$ and accumulating results of the multiply-and-accumulate operation comprises calculating $u_k = \Sigma_{j=1, \ldots, J} v_j \times w_{k,j} = \Sigma_d \Sigma_{j \in \Psi(d,k)} v_{\Omega(j,k)} \times w_{k,j} = \Sigma_d c_{d,k}$.

According to a further embodiment of the disclosure, the method includes initializing an integer $f$ and its upper bound $f_{max}$ to predetermined values, selecting a subset of indices k', . . . k" for the output vectors $u_k$ of the current layer, and incrementing $f$, and if $f \geq f_{max}$, setting $f$ to $f_{max}$.

According to a further embodiment of the disclosure, the method includes scaling the integer addition result by $(f−M)$, where M is a number of fractional bits in the result, and when a scaled multiplication result requires L−1 or more bits, where L is an integer word size of an addition unit, setting a is-near-overflow condition to TRUE, otherwise setting is-near-overflow to FALSE.

According to a further embodiment of the disclosure, the method includes, when is-near-overflow is FALSE and $f<f_{max}$, incrementing $f$, and when is-near-overflow is TRUE, decrementing $f$ and setting $f_{max}$ to the new value of $f$.

According to a further embodiment of the disclosure, the method includes dividing the output vector $u_k$ by $f$.

According to a further embodiment of the disclosure, the method includes applying a non-linear function F to the accumulated results of the multiplications, and saving the result as the output vector in an on-chip buffer.

According to another embodiment of the disclosure, there is provided a digital circuit for accelerating computations in a convolutional neural network that includes an external memory that stores an input vector, a weight vector, and an output vector, and a control unit. The control unit includes an on-chip memory that stores log-domain values of the input vector and weight matrix to be processed, a pairs selection unit that selects different subsets of pairs of log-domain input vector values and corresponding unprocessed log-domain weight vector values from the on-chip memory, and stores the pair values in a plurality of pairs of registers, and a core unit that includes a plurality of sub-units where each sub-unit performs a multiply-and-accumulate operation on the pair values in one pair of registers where multiplying the pairs of values comprises adding corresponding pairs of integers in a log domain. The core unit simultaneously calculates partial sums of z output values, where z is less than a total number of values of the output vector, where each partial sum includes a subset of linear domain multiplication results, and the control unit accumulates the partial sums into z corresponding registers associated with z output values.

According to a further embodiment of the disclosure, the digital circuit includes an accumulator that accumulates results of the multiply-and-accumulate operations for the different subset of pairs of input vector values and corresponding unprocessed weight vector values, a register that stores a result accumulated by the adder, a functional unit that applies a non-linear function to the result accumulated by the adder to calculate an output value, and an on-chip buffer that stores the output values.

According to a further embodiment of the disclosure, each pair of registers respectively holds a log-domain input value $v_{\Omega(j,k)}$ and a log-domain weight value $w_{k,j}$, respectively, where input value $v_{\Omega(j,k)}$ is an element of an input vector with J elements, and $w_{kj}$ is an element of a kth column vector of a K×J weight matrix, and $\Omega(j,k)$ is a subset of the input indices $\Omega(I, k), \Omega(j, k)$. Each subunit includes a multiplier that calculates $v_{\Omega(j,k)} \times w_{k,j}$, and an adder that accumulates products of die subunits. A number of subunits i is less than the number of input values J.

According to a further embodiment of the disclosure, the external memory stores log-domain values of the weight matrix, and where the control unit comprises a log-convertor unit that converts a linear-domain input vector value into the log domain before the input vector value is stored in the on-chip memory.

According to a further embodiment of the disclosure, the multiplier includes an adder that calculates and outputs s=v'+w', shift register calculates $\lfloor s/R \rfloor$ by right shifting s by N bits, where $\lambda = 2^{1/R}$ is a base of the log domain and $R=2^N$, an extraction unit that calculates p=s % R by extracting the N least significant bits of s, a LUX that maps p into a positive number and calculates $x=2^{(M+p/R)}$, where x is an unsigned integer of the form 1+M bits, a subtracter that calculates $y=\lfloor s/R \rfloor - M$, and a shift register that left shifts x by y bits, and outputs a result $v \times w \cong 2^{\lfloor s/R \rfloor} \times 2^{[(s \% R)/R]}$.

According to a further embodiment of the disclosure, the core unit includes a first maximization unit that takes as input all i outputs $\lfloor s_i/R \rfloor$ of the shift register of the multiplication units and calculates $q=\max_i \lfloor s_i/R \rfloor$, a second maximization unit that calculates $f=L-2-q-\delta$ and $\alpha=f-M$, where L is an integer word size of die adder, $\delta$ is a user defined constant that determines the effective number of bits in the adder, $f$ is a predetermined integer of order O(10), and provides the output a as input to the subtractor of each multiplication unit, a sign extraction unit that extracts a sign $g_j$ of a multiplier result $v_{\Omega(j,k)} \times w_{k,j}$ and outputs a result $\sigma_i = v_i \times w_i \times g_i \times 2^f$ to the adder, and a shifter that divides the accumulated products received from the adder by $2^f$.

According to a further embodiment of the disclosure, die digital circuit includes a floating point conversion unit that converts accumulated products received from the adder into a floating point representation.

According to a further embodiment of the disclosure, L is predetermined to tradeoff accuracy and power usage of the digital circuit.

According to a another embodiment of the disclosure, there is provided a digital circuit for accelerating computations in a convolutional neural network that includes a plurality of sub-units that include at least one look-up-table (LUT). Each sub-unit performs a multiply-and-accumulate operation on a pair of input values by using the at least one LUT that maps an integer p into a positive number that approximates $B^{(M+p/R)}$, where p, R, and M are integers, and B is a real number.

According to a further embodiment of the disclosure, each subunit includes a pair of registers that respectively holds a log-domain input value $v_{\Omega(j,k)}$ a log-domain weight value $w_{k,j}$, respectively, where input value $v_{v(j,k)}$ is an element of an input vector with J elements, and $w_{kj}$ is an element of a kth column vector of a K×J weight matrix, and $\Omega(j,k)$ is a subset of the input indices $\Omega(l, k), \ldots, \Omega(j, k)$, a multiplier that calculates $v_{\Omega(j,k)} \times w_{k,j}$, an adder that accumulates products of the subunits, and a sign extraction unit that extracts a sign $g_j$ of a multiplier result $v_{\Omega(j,k)} \times w_{k,j}$ and outputs a result $\sigma_i = v_i \times w_i \times g_i \times 2^f$ to the adder. A number of subunits i is less than the number of input values J.

BRIEF DESCRIPTION OF THE DRAWINGS

FIGS. 5A to 5B is a flowchart, of an algorithm for a NN LPA with an adaptive fix-point scale factor, according to an embodiment of the disclosure.

DETAILED DESCRIPTION OF EXEMPLARY EMBODIMENTS

Figure 1:
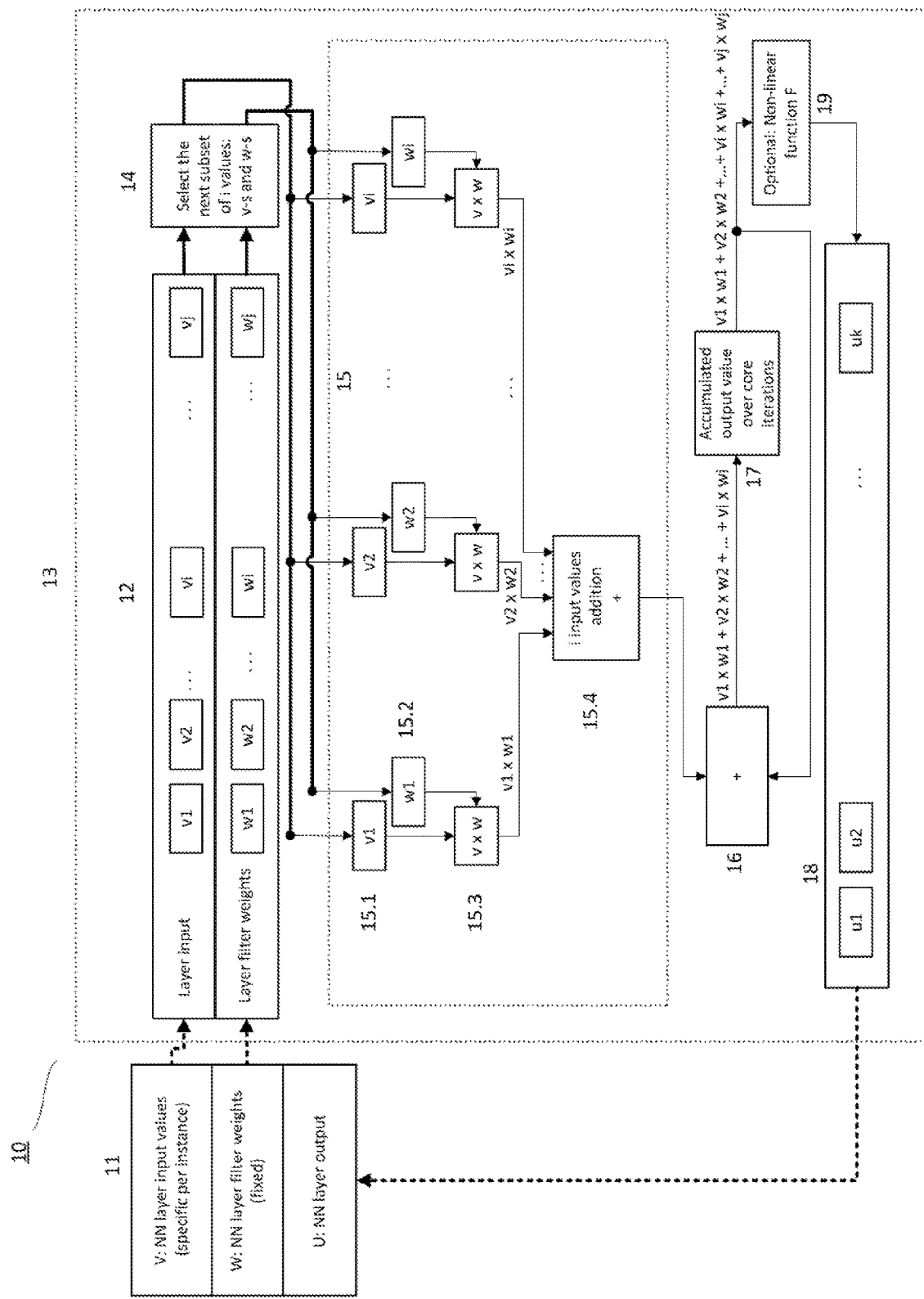
FIG. 1 depicts a top level, simplified overview of a hardware system according to an embodiment of the disclosure for accelerating NN and CNN computations.

Exemplary embodiments of the disclosure as described herein generally provide systems and methods that accelerates the central computation of a convolutional neural network mathematical model while consuming low power and maintaining the required precision. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Overview

A Neural Network (NN) is a method of computation that processes an input vector $V=v_1, \ldots, v_J$ with J elements by repeated activation of 'layer computations'. There are several types of layer computations, where the central, highly used, and most resource demanding type implements many multiply-accumulate (MAC) operations of the form:

$$u_k = F(\Sigma_{j=1,\ldots,J} v_j \times w_{k,j}) \quad (1)$$

The output of the layer is a vector $U=u_1, \ldots, u_K$ with K elements. Each output value $u_k$ is computed by adding J multiplication results of the form $v_j \times w_{k,j}$, where $w_{k,j}$ can be represented as a K×J matrix. The result is then processed by a non-linear function F. The entire set of layer parameters, $W=w_{1,\ldots,K,1,\ldots,J}$ is part of the NN definition, and is fixed in the sense that the same parameters are used while processing different instances of input vectors. For each k, a unique subset of weights $W_k=w_{k,1} \ldots w_{k,J}$ is used for calculating the instance of output $u_k$ from the input instance vector V.

A Convolution Neural Network (CNN) is a special type of NN that process 2- or 3-dimensional input images by sequentially applying layer computations. The central layer type operation is convolution. While convolution has a more complex structure in terms of reuse of both input and weight elements during the computation of different output values, it can be represented in a format similar to EQ. (1):

$$u_k = F(\Sigma_{j=1,\ldots,J} v_{\Omega(j,k)} \times w_{k,j}) \quad (2)$$

Unlike a NN where all input values are used during the computation of each output value $u_k$, the CNN may use only a subset of the inputs $\Omega_k = \Omega(1, k), \ldots, \Omega(j, k)$ for the same purpose. The set $\Omega_k$ can depend on the location of $u_k$ in the 3-dimensional arrangement of output values, and on other well-known attributes of the convolution operation such as stride and padding. Moreover, many of the sets $W_k$'s for different values of k are identical, but are used with different subsets $\Omega_k$ of the input to derive different output values. The term filter will be used hereinbelow for a set of reusable W's. The set of output values u's calculated with one such filter is referred to as an output slice, or an output map. Typically the layer computation includes several filters and corresponding output slices. Notice that EQ. (1) is a simpler version of EQ. (2) where $\Omega$ is always the trivial mapping $\Omega(j, k)=j$ regardless of L This covers the case of a NN as well as the case of what is known as the 'fully connected' type of CNN layers. Embodiments of the disclosure include many choices for $\Omega_k$, which can differentiate between the NN operation and variants of the CNN convolution operation. All of these variants can be computed using an embodiment of the disclosure, and differ only in the hardware logic that implements the indexing of $\Omega_k$. The term Neural Network (NN) as used herein below refers to both a NN and a CNN.

The processing of one NN layer, that is the computation of one output vector U from a given input vector V and weights W, and possibly a non-trivial indexing logic $\Omega$, may involve billions of multiply-accumulate operations. Embodiments of the disclosure are directed to a method and a corresponding hardware system for accelerating computations of the type expressed by EQS. (1) and (2).

A NN can have various topologies of layers. In simple networks, the output of one layer serves as an input to another layer so that layer computations are performed sequentially. In more complex type of networks, the output of one layer can be input to several layers, and the aggregate outputs of some layers can be the input to yet another layer. The process of passing the output of one layer to the input of another does not use many computational resources. Embodiments of the disclosure are independent of the process of passing the output of one layer to the input of another.

Aspects of embodiments of the disclosure include the following:
1. Power efficient data management for highly parallel processing;
2. Efficient low power multiplication method in log domain with adjustable accuracy;
3. Efficient, fixed point, addition with scale adaptation:
   Online computation of relative scale and fast scale adaptation;
   Online predication of absolute scale and slow scale adaptation;
4. Controlling the accuracy—power tradeoff;
5. Zero skipping during multiplication and addition; and
6. Combined fixed point and floating point computation; multiplication in floating point, most additions in fixed point and some additions in floating point.

Power-Efficient Data Management for Highly Parallel Processing

This section describes a high level, general system according to an embodiment for accelerating a CNN computation, and focuses on methods for efficient data flow for massive parallelization. The computations described above can be parallelized. A hardware system according to an embodiment for parallel computations includes i identical multiplication units, synchronized by a system clock, each capable of implementing multiplication of two values, an input value and a weight value. The multiplication units are connected to corresponding summation units, sufficient in number to add all results, in a pipelined manner. While this is a straightforward approach, a more subtle issue is how to make available many input pairs to be processed by the parallel units. If, for example, i=512, then 1024 values should be made available to the multiplication units at each cycle of system clock, e.g. at the rate of 1 Giga Hertz, to maximize utilization of the parallel machine. To support the throughput and speed used for high parallelization at low power and low cost, a system according to an embodiment includes a relatively small on-chip memory that can be accessed widely and synchronically with the multiplication and addition units. In addition, a system according to an embodiment includes a large external memory that holds the large number of values, namely the input V, weights W and output U involved in an MN computation. Note that in a modern NN, the number of weights alone may be above 60 million. While holding this large number of values on the chip would have used a large and highly expensive on-chip memory, storing it in DRAM is much less expensive. Moreover, if the accelerator is part of a larger system, such components are already available, and have no additional cost. However, both the input values and the weights are heavily reused during the computation. Instead of passing these values over and over from the external storage directly to the multiplication units, which would involve a very wide and costly bus and consume a lot of power, a system according to an embodiment loads the data into the on-chip memory only once for each layer computation, and manages the high throughput passing of selected pairs of values, at each clock cycle, from the on-chip memory to the input registers of the parallel multiplication units.

FIG. 1 depicts a top level, simplified overview of a hardware system 10 according to an embodiment for accelerating NN and CNN computations of the type expressed by EQS. (1) and (2). In addition to the external memory 11 and on-chip memory 12 described above, a chip according to an embodiment includes several control and processing units: a main control unit 13, a pairs-selection-unit 14 and a core unit 15.

According to an embodiment, the core unit 15 has i identical sub-units that implement the multiplication and addition (MAC) operations. Each subunit includes a pair of registers 15.1 and 15.2 for holding die input value $v_{\Omega(j,k)}$ the weight $w_{k,j}$, respectively, a multiplier 15.3 for calculating $v_{\Omega(j,k)} \times w_{k,j}$, an adder 15.4 for accumulating the products of the subunits. While i can be large, e.g. ~512 as described above, it is limited by the chip area and power resources devoted for the hardware accelerator. It is often the case that i<J and so multiple activations of the core are used to complete all J MACs used for calculating one output value $u_k$.

According to an embodiment, the main control unit 13 manages these activations as well as the process of loading the input and weights from external memory, and writing the result back to the external memory as the output. The main control unit 13 implements two nested loops that coordinates several aspects of the processing.

A hardware system 10 according to an embodiment also includes an adder 16 for accumulating the results over the various input subsets $\Omega_k$, a register 17 for storing the result, an on chip buffer 18 for storing output values $u_k$, and an optional functional unit 19 that applies a non-linear function $f$ to the accumulator result.

Notice that for simplicity of notation, FIG. 1 depicts the core as implementing the MAC operation for some set of i arbitrary pairs of v's and w's:

$$c = \Sigma_i v_i \times w_i. \tag{5}$$

According to another embodiment of the disclosure, i multiplications are calculated simultaneously by the core unit, but these are not ah part of one sum associated with one output $u_k$. Rather, the core simultaneously calculates partial sums of z output values, where z is less than the total number of output values, and where each of these partial sums includes a subset of the multiplication results. After these results are calculated, the partial sums are accumulated by the main control unit into z corresponding registers associated with z output values.

Figure 2:
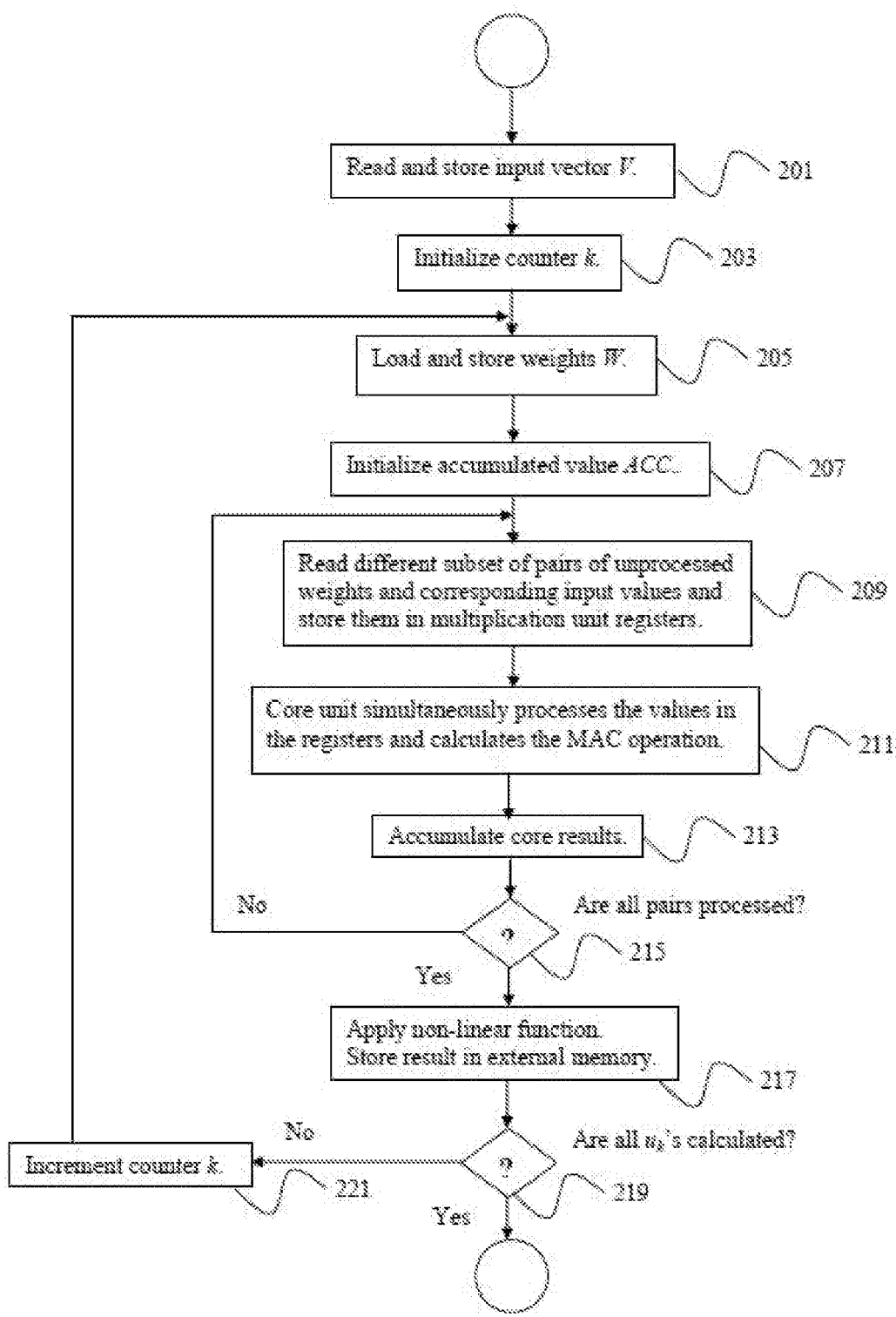
FIG. 2 is a flowchart of a method for processing a single NN layer implemented by a main control unit, according to an embodiment of the disclosure.

FIG. 2 is a flowchart of a method for processing a single NN layer implemented by the main control unit, according to an embodiment of the disclosure.

Referring now to the figure, relevant input values and weights needed for calculating the first output value $u_k$ for k=1, are read from the external memory, over a bus, and stored in on-chip memory. The bus may be large, such as an AXI Bus, at 256 bits per cycle. According to embodiments, since the same input vector V is used for all subsets of weights W, the input vector V is read at step 201 before initializing k to 1 at step 203. At step 205, the subset of weights $W_k$ needed for calculating the output vector $U_k$ is read from external memory, and is stored in the on-chip memory. At step 207, the accumulator value ACC is initialized to zero.

Next, the pairs selection unit reads a different subset of i pairs of input and weights, according to the indexing logic $\Omega$. For example, the pair selection unit can choose j=1+i(d−1), . . . , i(d−1)+i, for iteration d during the calculation of a specific $u_k$. In general, the pair selection unit implements a mapping $\Psi$, where $\Psi$(d, k) is a set of i indices selected for iteration d of calculating and that the union over ail iterations d is simply the entire set of indices 1, . . . , J. The input values and weights are read from the on-chip memory, and stored in a set of core unit registers. The core unit includes many identical multiplication and addition units, and each pair of registers is connected to one of the multiplication units within the core unit.

According to embodiments, at step 209, the pairs selection unit reads a different subset of i pairs of unprocessed weights $w_{k,j}$'s from $W_k$ and corresponding input values, from the on-chip memory, and stores these values in registers of the multiplication units within the core unit.

Then, at step 211, the core unit simultaneously processes the values in the registers and calculates the MAC operation, for $u_k$ for some k:

$$c_{d,k} = \Sigma_{j \in \Psi(d,k)} v_{\Omega(j,k)} \times w_{k,j}. \tag{3}$$

The main control unit accumulates the core results $c_{d,k}$'s at step 213 for d iterations until all pairs 1, . . . , j are processed by the core, where steps 209, 211, and 213 are repeated from step 215, such that the full sum of equation EQ. (2) for the current output $u_k$ is calculated. Then, at step 217, the non-linear function F is applied to the accumulated result:

$$u_k = F(\Sigma_{j=1,\ldots,J} v_j \times w_{k,j}) = F(\Sigma_d \Sigma_{j \in \Psi(d,k)} v_{\Omega(j,k)} \times w_{k,j}) = F(\Sigma_d c_{d,k}), \tag{4}$$

and the output is collected by an on-chip buffer. The non-linear function F may optionally be applied by another hardware unit, or alternatively later, not as part of the accelerator, by other means. If, at step 219, not all $u_k$'s have been calculated, k is incremented at step 221 so that the next output $u_k$ in the current slice can be processed, by going back to step 205 and repeating the process for all output values $u_j, \ldots, u_k$. Eventually, the output is written through the bus to the external memory. Once an input value or weight, located in the on-chip memory, is no longer needed for calculating any of the following, yet non-computed, output values, it can be released from memory. Using this approach, only a relatively small on-chip memory is used to manage the computations.

Notice that for simplicity of notation, FIG. 1 depicts the core as implementing the MAC operation for some set of i arbitrary pairs of v's and w's:

$$c = \Sigma_i v_i \times w_i. \tag{5}$$

According to another embodiment of the disclosure, i multiplications are calculated simultaneously by the core unit, but these are not all part of one sum associated with one output $u_k$. Rather, the core calculates partial sums of z output values simultaneously, where each of these partial sums includes a subset of the multiplication results. After these results are calculated, the partial sums are accumulated by the main control unit into 2 corresponding registers associated with z output values.

An accelerator according to embodiments can be used for the computation of NN layers, CNN convolution layers, and CNN 'fully connected' layers. The difference between these types of layers is the mapping Ω, and the corresponding logic that implements the specific order of loading input values and weights from the external memory to the on-chip memory, and the order of selecting the relevant subsets of pairs to be calculated by the core. The relevant loading order and selection is naturally defined by the description of the specific layer type, as is known in the art, and as can be implemented by any experienced digital designer.

Efficient Low Power Multiplication Method in Log Domain, with Adjustable Accuracy This section describes a high level system according to an embodiment for accelerating the NN computation, focusing on efficient, low-power, loading and reusing of NN input values and weights used for massive parallelization.

According to an embodiment, assume two positive real numbers v and w, and a real, positive number λ. Based on the logarithm function in base λ, the multiplication operation can be stated as an addition:

$$v \times w = \lambda^{log_\lambda(v \times w)} = \lambda^{log_\lambda v + log_\lambda w}. \quad (6)$$

According to an embodiment, constructing a hardware implementation of this equation involves several issues:
How to convert the values v and w to the log domain;
How to convert the result back to the linear domain; and
What representation to use, and how to control the accuracy of the result.

Using the notation $\lfloor x \rfloor$ for the integer part of x, rounded towards $-\infty$, let:

$$v' = \lfloor log_\lambda v \rfloor, w' = \lfloor log_\lambda w \rfloor, s = \lfloor log_\lambda v \rfloor + \lfloor log_\lambda w \rfloor = v' + w',$$

where v', w', and s are all signed integer numbers. According to embodiments, it can be assumed that the method and hardware represent signed integer values using 2's complement format. However, embodiments are not limited thereto, and similar calculation can be performed, possibly with minor modification, based on other singed integer representation conventions, in other embodiments.

Using the above notation:

$$v \times w = \lambda^{log_\lambda v + log_\lambda w} \cong \lambda^{\lfloor log_\lambda v \rfloor + \lfloor log_\lambda w \rfloor} \cong \lambda^{v'+w'} = \lambda^s. \quad (7)$$

The accuracy of the approximation $v \times w \cong \lambda^s$ depends on the selection of λ. The smaller λ gets, the larger $log_\lambda v$ becomes. As a result, die mean error over different v's, $e = log_\lambda v - \lfloor log_\lambda v \rfloor$, decreases and the approximations improves. The case of $\lambda = 2^{1/R}$, $R = 2^N$, for a small integer N, is especially useful for hardware design with small footprint and low power consumption.

Using the definition of the remainder operation s % R ≡ s − ⌊s/R⌋×R:

$$v \times w \cong \lambda^s = (2^{1/R})^s = 2^{s/R} = 2^{\lfloor s/R \rfloor + \frac{(s\%R)}{R}} = 2^{\lfloor s/R \rfloor} \times 2^{s\%R/R}. \quad (8)$$

For example, for the choice of: N=7, R=2$^7$=128, λ=2$^{1/128}$, one can obtain:

$$v \times w \cong 2^{\lfloor s/128 \rfloor} \times 2^{(s \% 128)/128}. \quad (9)$$

The computation $\lfloor s/R \rfloor$ can then be implemented by a simple hardware unit that applies the arithmetic right shift operation: $\lfloor s/R \rfloor = s >> N$, using C language notations when s is represented in a signed integer format using, for example, two's complement coding. The unit should correctly address the negative cases.

The corresponding operation s % R can then be simply implemented by taking the N LSBs (least significant bits) of s. These bits represent a positive integer value in the range 0 to R−1. To implement the operation $2^{(s \% R)/R}$, a lookup-table (LUT) hardware unit that maps p=s % R, in the range [0, R−1], to a positive number in the range [1, 2), i.e., represented as a positive binary fraction in the form 1.bbb . . . with 1+M bits, where M excludes the preceding 1. Notice that the preceding 1 before the point is always there, and does not have to be stored in the LUT. The implementation of the entire operation $2^{\lfloor s/R \rfloor} \times 2^{(s \% R)/R}$ can be completed by taking the representation 1.bbb . . . and left shifting it by $\lfloor s/R \rfloor$ bits, that is, applying $2^{(s \% R)/R} << 2^{\lfloor s/R \rfloor}$. The approximate result is of the form aaaaa.bbb with M bits after the point.

Alternatively, the output of the LUT can be considered as an unsigned integer of the form 1bbb . . . , with 1+M bits that includes the 1 that represents the value $2^M \times 2^{(s \% R)/R}$. Using this representation the shift left operation is by $\lfloor s/R \rfloor$−M bits, that is, applying $2^{M+(s \% R)/R} << \lfloor s/R \rfloor$−M. Using the binary unsigned integer representation, the result represents the integer part $\lfloor 2^{\lfloor s/R \rfloor} \times 2^{(s \% R)/R} \rfloor$.

Figure 3:
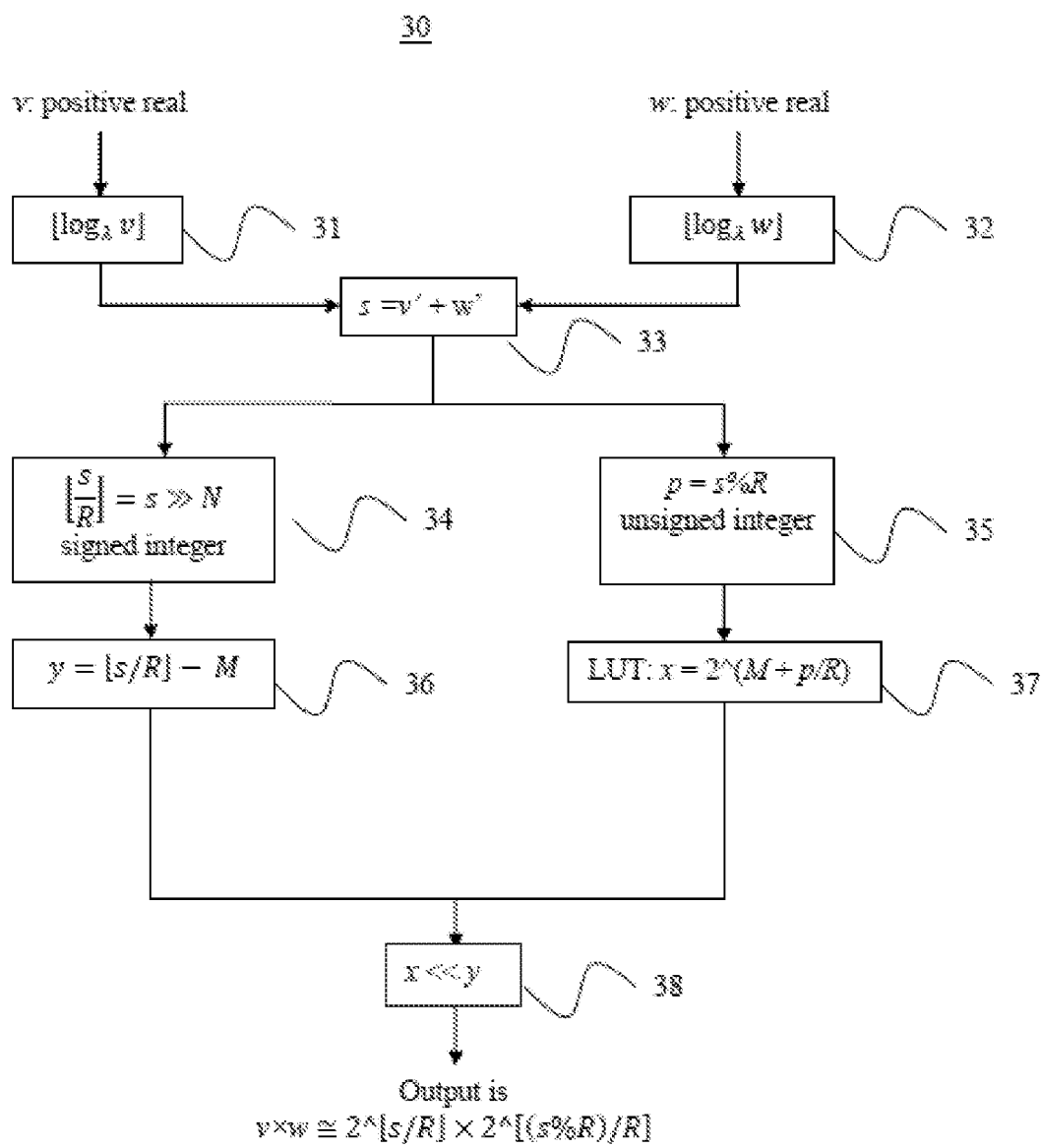
FIG. 3 depicts presents a hardware implementation of a multiplication approximated by a log domain addition, according to an embodiment of the disclosure.

FIG. 3 depicts presents a hardware implementation of a multiplication approximated by a log domain addition, according to an embodiment of the disclosure. Referring now to the figure, a multiplier 30 includes functional units 31 and 32 that respectively calculate $v' = \lfloor log_\lambda v \rfloor$ and $w' = \lfloor log_\lambda w \rfloor$ for inputs v and w. Adder 33 calculates and outputs s=v'+w'. Block 34 is a shift register calculates $\lfloor s/R \rfloor$ by right shifting s by N bits, and block 35 calculates p=s % R by extracting the N least significant bits of s. Block 36 subtracts M from $\lfloor s/R \rfloor$ to calculate y, while block 37 refers to a LUT to calculate x=2^(M+p/R), which is an unsigned integer of the form 1+M bits: 1 bbb, . . . . Block 38 is a shifter that left shifts x by y bits, and outputs the result $v \times w \cong 2^{\lfloor s/R \rfloor} \times 2^{[(s \% R)/R]}$. The implementation shown in FIG. 3 is exemplary and non-limiting, and these elements have many actual implementations in other embodiments. For example, in other embodiments, the functional units that calculate $\lfloor log_\lambda v \rfloor$ and $\lfloor log_\lambda w \rfloor$ may not be part of the multiplier, but rather separate from the multiplier.

In the discussion it was assumed that v and w are positive real numbers, however, embodiments of NN computations are not limited thereto. According to other embodiments, the computation and circuit can use the absolute values |v| and |w|. The correct sign of the result, that is, the XOR of the signs of v and w can then be assigned to die positive result of the log-based multiplication unit.

According to embodiments, in most cases, implementing the multiplication of two real number using addition in the log domain is more demanding. In terms of power consumption and hardware size, compared to a standard multiplication approach. The two hardware units used to implement the $log_\lambda(x)$ function, in base λ, over the two input values, and the corresponding $\lambda^x$ function, over the result, are demanding in terms of hardware size and power. Although the addition unit is simpler, smaller and less power-demanding compared to the more complex multiplication unit, this advantage is overcome by size and power requirements of the additional $log_\lambda(x)$ and $\lambda^x$ units.

However, according to an embodiment, the ease of a neural network is different due to the special context in which the multiplication is used. There are three aspects as to why a log-based multiplication hardware is efficient for NN hardware acceleration. First, the accuracy of the computation does not need to be high, since the processed signals, such as images and voices, are inherently noisy. As a NN is robust against this noise, it is also typically robust, by design, against inaccuracies in the computation itself. Then, there is a high degree of reuse for both the input value and the weights, such that the number of conversion operations into the log domain, of the type $v'=\lfloor \log_\lambda v \rfloor$, and $w'=\lfloor \log_\lambda w \rfloor$, is significantly less than the number of multiplication operations. Since the weights of a given trained NN are completely fixed, the conversion $w'=\lfloor \log_\lambda w \rfloor$ can be performed once offline for all w's, e.g., in software, and the log version w' of the weights can be fully reused for all input instances.

The input values v's differ between instances. However, for a NN, as can be seen from EQ. (1), a single input value, e.g., $v_1$, is reused k times, once for each calculation of an output value $u_k$. In the case of a CNN, although not all input values participate in the computation of all output values, each input value does typically contribute to the computation of many output values. For example, convolution layer 2 of one well-known image classification CNN has 200,704 input values, but has as many as 202,309,632 multiplications. So, the relative effort of converting the input values to the log domain is negligible compared to the potential gain of using log-based computation based on the log inputs.

Finally, a NN computation adds the result of each v×w multiplication with many other results. According to embodiments, the values to be added are scaled to efficiently exploit the active range of the adder units, as will be described below. According to embodiments, scaling can be combined as part of a left shift operation x>>y which is part of the log-domain multiplication unit. This farther reduces the overall chip-logic and power used for the combined multiply-add operation.

A main control unit according to an embodiment described above loads and stores values in the linear domain. According to embodiments, the same flow control and pair selection logic can be used when the computation is done in the log domain. However, the values that are stored and processed are now logarithmic versions of the original values. The external memory already contains log versions of the original weights that can be read and directly stored in the on-chip memory. However, the layer input values stored in the external memory are the output of previous layer computation and are not in log domain. The main control unit reads the input values, calculates their logarithmic versions, and stores them in the on-chip memory for farther processing.

Efficient Fixed Point Addition with Automatic Scale Adaptation

This section describes how addition of many values is implemented efficiently in a low power accelerator (LPA) according to an embodiment, and presents details of a parallel processing core unit of an LPA.

As described in above, a convolution operation according to an embodiment can be implemented using repeated application of a core unit which is calculating die multiply-accumulate operations of EQ. (5) in parallel using i sub-units. As the following discussion is focused on an implementation according to an embodiment of a core unit for EQ. (5), an arbitrary set of selected $v_i$'s and $w_i$'s with the index i is described below, ignoring the indexing Ω and Ψ used for selecting the set by the main control unit.

According to an embodiment, based on a log-domain multiplication discussed above, EQ. (5) can be reformulated as follows:

$$c = \Sigma_i v_i \times w_i \cong \Sigma_i \lfloor 2^{\lfloor s_i/R \rfloor} \times 2^{(s_i \% R)/R} \rfloor g_i \quad (10)$$

where $g_i \equiv \text{sign}(v_i) \text{sign}(w_i)$ is the correct sign of $v_i \times w_i$.

In many NN's, it is often the case that typical inputs v's and w's are real numbers, whose absolute values are less than 1, or not much greater than 1. As discussed above, each $v_i \times w_i$ that is approximated by a log-domain multiplication circuit according to an embodiment is an integer, but which then deviates from the true value. A final sum of integer values will also have a similar high approximation error. To reduce this error, an LPA according to an embodiment implements the following equation instead:

$$\sum_i v_i \times w_i = \frac{\sum_i 2^f \times v_i \times w_i}{2^f} \cong \frac{\sum_i \lfloor 2^{\lfloor s_i/R \rfloor + f - M} \times 2^{M + (s_i \% R)/R} \rfloor g_i}{2^f} = \frac{\sum_i \sigma_i}{2^f}, \quad (11)$$

where, $$\sigma_i \equiv \lfloor 2^{\lfloor s_i/R \rfloor + \alpha} \times 2^{M + (s_i \% R)/R} \rfloor g_i, \alpha \equiv f - M. \quad (12)$$

Assuming a small, positive, integer $f$, e.g., $f=10$, the sum $\Sigma_i \sigma_i$ is over much larger integer numbers, and the relative error, with respect to the true sum, is much smaller. An LPA according to an embodiment includes a large addition unit with i signed integer inputs of L bits. The result is also a signed integer with a greater number of $L + \lceil \log_2(i) \rceil$ bits. This can guarantee that there is no overflow during the summation. Naturally, the larger L is, the larger the hardware logic and the corresponding physical size and power consumption of the addition unit. On the other hand, a smaller L means that a smaller $f$ is used to ensure that $\sigma_i$ can be represented with L bits. This reduces the accuracy of the final result since taking the integer part of $\lfloor 2^{\lfloor s_i/R \rfloor + \alpha} \times 2^{M + (s_i \% R)/R} \rfloor$ introduces a larger relative error with respect to the full value, Notice that L is a fixed characterization of the addition unit and can be set by a design according to an embodiment.

According to an embodiment, for a given selected L, the following two sub-sections describe two different methods to optimize the accuracy of an addition computation by utilizing as many bits as possible from L. According to an embodiment, a value $f$ is chosen that ensures a maximal $\sigma_i$'s and high utilization of the addition unit, in terms of active bits, but also reduce or prevents an overflow risk that $\sigma_i$ uses more than L bits for signed integer representation.

Online Fast Scale Adaptation Per Core Activation

One method according to an embodiment for choosing $f$ is to stretch the limit, that is, to ensure that at least one of the σ's uses all L bits, while all σ's use at most L bits. A core according to an embodiment includes a maximization unit over i inputs, and two adder units. A maximization unit receives as an input the values $\lfloor s_1/R \rfloor, \ldots, \lfloor s_i/R \rfloor$ previously calculated by the core using EQS. (11) and (12), and fixed system parameters R, L, M, and computes two values α and $f$:

$$q = \max_i \lfloor s_i/R \rfloor, f = L - 2 - q - \delta, a = f - M, \quad (13)$$

where δ is an as-yet unspecified system parameter.

δ is a user-define configurable 'knob' that allows controlling the accuracy vs. power-consumption trade-off. Recall that a NN according to an embodiment has L-bits-input adders units, that is—each unit that can sum input values of up to L-bits without risking overflow. If a user chooses to set δ to 0, the adders operate at maximal utilization, since the input value can actually be as large as L-bits, and the result Is as accurate as the system can deliver, given the available L-bits adders. Alternatively, if the user chooses a non-zero δ, e.g. 1, 2, up to L−1, the input values are always less than L-bits, the adders are not utilized at full bit-width and the accuracy of the output is reduced, compared to the δ=0 status. However, since there is less toggle of hardware 'flip-flops' in the adders, less energy is consumed by the system.

For example, a visual object classification NN can use billions of addition operations for choosing the visual class of objet in an image. However, recent results shows that 16 and even 8 bits operations are sufficient to achieve nearly identical classification results as 32 bit operations. So, for example, a system where L=16 supports up to 16 bits adders, but the user can choose delta=8, which makes all input values to the adder expressed with 16−8=8 most significant bits only, consumes much less energy for NN calculations, and still delivers similar final classification results. For other NN-s which do require higher accuracy for each addition operation, the same hardware can utilize all 16 bits in the adders, by choosing δ=0.

Taking a specific value s for which $\lfloor s_i/R \rfloor$ was maximal, then $q=\lfloor s/R \rfloor$. Consider any $s_i$ and specifically the maximal s, then $$0 \leq \frac{(s \% R)}{R} < 1,$$

and $1 \leq 2^{(s \% R)/R} < 2$. Following EQ. (12), for the σ corresponding to the maximal s:

$$|\sigma| = \lfloor 2^{\lfloor s/R \rfloor + \alpha} \times 2^{M + (s \% R)/R} \rfloor = \lfloor 2^{q+\alpha M} \times 2^{(s \% R)/R} \rfloor$$
$$< 2^{L-1-\delta}. \quad (14)$$

This means that the unsigned |σ| is expressed as a binary integer using L−1−δ bits, and the signed σ is expressed using L−δ bits, if it is negative. For all other $s_i$'s, since $\lfloor s_i/R \rfloor \leq \lfloor s/R \rfloor$, L−δ bits are sufficient. While L, once selected, defines the physical size of a central shifter in each multiplication unit, as well the size of the addition unit, δ is a configurable system variable. According to an embodiment, δ can be set to 0 to get the maximal bit utilization of the adder, and the highest computation accuracy that can be delivered with L bits. If however, for a specific NN layer, a lower accuracy is sufficient, setting a higher δ in the range 0<δ<L−2 will guarantee that at least δ MSB's (most significant bits) of every $\sigma_i$ are always 0, reduce the accuracy of summation, but also save energy, as fewer bits are toggled during the addition.

Figure 4:
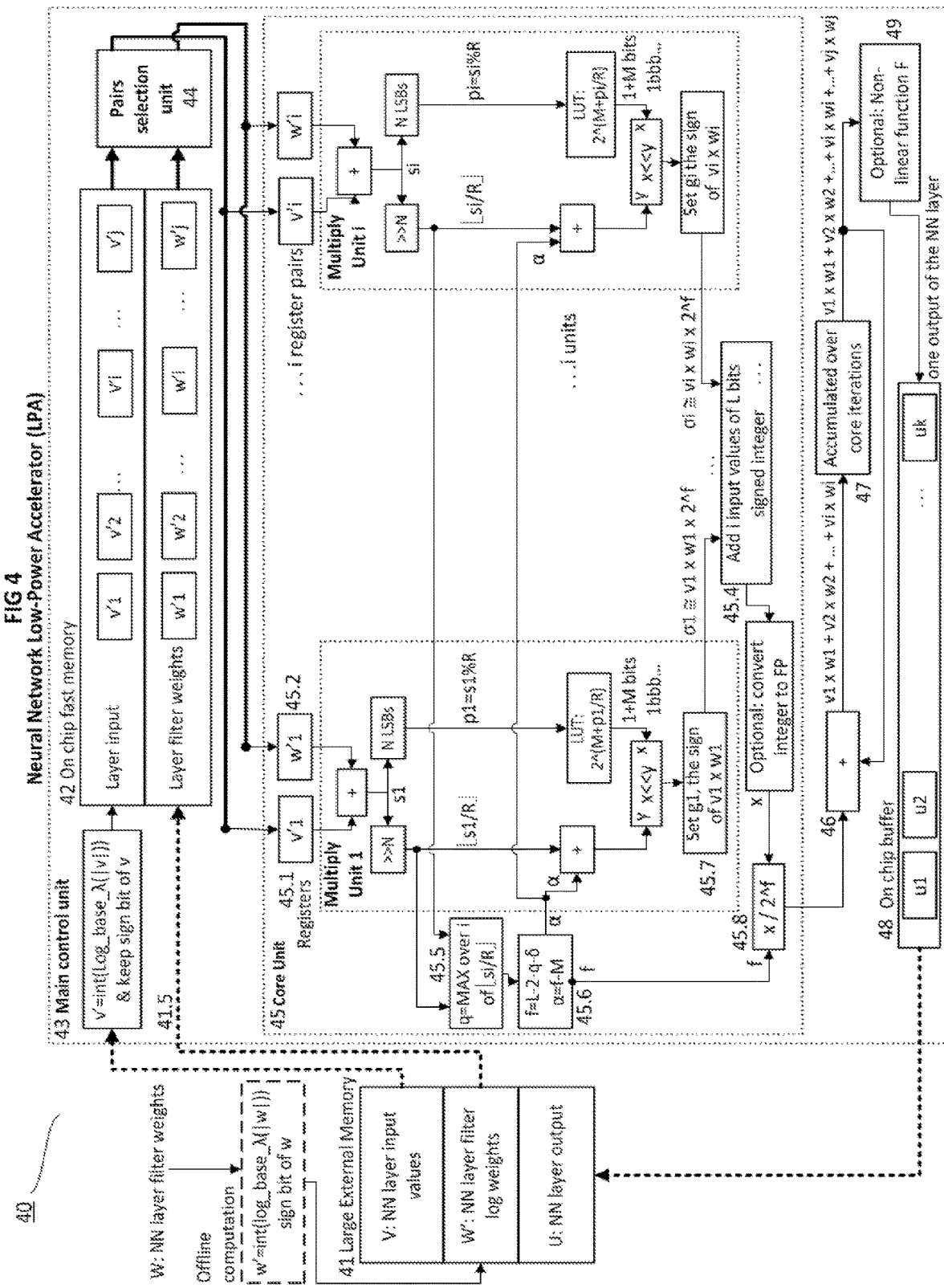
FIG. 4 depicts a design of an NN low-power accelerator (LPA) with log-based multiplication and highly adaptive fixed point addition.

FIG. 4 depicts a design of an NN LPA 40 according to an embodiment that includes the components described above: an external memory 41, an on-chip memory 42, a main control unit 43, a pairs-selection-unit 44 and a core unit 45. In addition, a hardware system 40 includes an adder 46 for accumulating the results over the various input subsets a register 47 for storing the result, an on chip buffer 48 for storing output values $u_k$, and an optional functional unit 49 that applies a non-linear function $f$ to the accumulator result.

The external memory 41 stores the NN layer input values V, the NN layer log weights W, and the NN layer output values U. In an offline computation, the weights W can be converted into the log domain: $w'=\text{int}(\log_\lambda |w|)$, where the sign bit of w is saved. The on-chip memory 42 stores the NN layer input V and the weights W. Block 41.5 converts the NN layer input values V into the log domain when the input values are loaded into the on-chip memory 42: $v'=\text{int}(\log_\lambda v)$, where the sign bit of v is saved.

The main control unit 43 loads into on-chip memory 42 the values v's and w's already in the log domain, manages the double loop described above with respect to FIG. 2, activates the pairs-selection unit 44 and the core unit 45, and outputs the results to external memory 41. The pairs-selection unit 44 chooses a subset of pairs for processing at each cycle as described above. The core unit 45 includes i instances of multiplication unit 45.3. For clarity of illustration, only the first multiplication unit 45.3 is labeled. Each multiplication unit 45.3 is substantially similar to the unit depicted in FIG. 3, except that they lack functional units that perform the conversion to the log-domain, and include a sign extraction unit 45.7, described below. For clarity of illustration, the individual components of each multiplication unit 45.3 are not labeled with reference numbers, although they correspond to the components depicted in FIG. 3. Each multiplication unit 45.3 operates on one input pair in registers 45.1 and 45.2, and is based only on adders, shifters and the LUT as described above. The main shifter in each unit has a dual role: it scales the integer values by $2^{\alpha+M}$ to reduce error, and contributes to the scaling by as part of the operation $2^{s_i/R}$. The sign extraction unit 45.7 calculates and sets the relevant sign $g_i=\text{sign}(v_i)\text{sign}(w_i)$ to the result. The output of sign extraction unit 45.7 is $\sigma_i = v_i \times w_i \times 2^f$. Notice that the representation of each log value v' or w' is a 2's complement signed integer that also includes an extra corresponding bit indicating sign(v) or sign(w) of the original value, which is not related to the sign of the log value. This extra bit is ignored during most of the computation and used only for calculating $g_i$.

The core unit 45 also includes maximization units 45.5 and 45.6 that choose over the scales of all multiplication results, a shift value $\alpha=f-M$ that maximizes bit utilization and representation accuracy with L bits as describe at the beginning of this section. Unit 45.5 takes as input all i outputs $\lfloor s_i/R \rfloor$ of shift register 34 of the multiplication units 45.3 and calculates $q=\max_i \lfloor s_i/R \rfloor$, and unit 45.6 calculates $f=L-2-q-\delta$ and $\alpha=f-M$. The output a is provided as input to the block 36 of each multiplication units 45.3.

The core unit 45 has a large integer adder unit 45.4 with i inputs of L bits that sums all multiplication results from the sign extraction unit 45.7. Before outputting the sum, the core unit divides it by $2^f$ in shifter 45.8 as expressed by EQS. (11) and (12).

The final output computation unit 46 accumulates several core results, which are stored in register 47, applies a non linear function 49, stores the result for each iteration in on-chip buffer 48, and sends the final CNN output vector U to the external memory 41, as described above. According to an LPA of one embodiment of the disclosure, the result of the core output by large integer adder unit 45.4 is converted from an integer into a floating point representation by a floating point conversion unit 45.9, and is further processed using floating point units. In an alternative embodiment of the LPA, integer units are used and represents output values in a fixed point representation that uses a given fixed point scale factor. The implementation shown in FIG. 4 is exemplary and non-limiting, and these elements have many actual implementations in other embodiments.

Experimental results with publically available image classification neural networks shows that using, for example, n=7, λ=1/128 and L=16 is sufficient to compute the per-class final probabilities at a mean accuracy of about 1% as compared to a result computed in a straightforward manner using floating-point multipliers and adders with 32 bit resolution.

Slow Scale Adaptation

The previous section described fast adaptation of an integer scale factor $f$ by independent calculation for every set of pairs processed by the core. While a method according to an embodiment optimizes the utilization of the hardware and maximizes the accuracy, it uses, for each core activation, the maximum of i input values. This uses both area resources for the maximization unit, and consumes power. According to embodiments, assuming some statistical dependence between the values processed in each core activation, a more stable $f$ can be used instead, possibly with some degradation of the bits utilization of the addition unit, and some reduction of accuracy. For example, one variant of an LPA according to an embodiment uses a selected value of $f$ that is fixed for each filter, that is, for the calculations of all values in an output slice that are performed using the same set of weights $W_k$ for different k's, as described above. Another variant according to an embodiment uses a unique value that is fixed for an entire NN layer.

According to an embodiment, the following method is used to select the value of $f$ based on processing one or more full instances of data, e.g., images, and evaluating the processed values during the NN layer computation.

Consider EQ. (2): $u_k = F(\Sigma_{j=1, \ldots, N} v_{\Omega(j,k)} \times w_{k,j})$, and let $u_{k'}, \ldots, u_{k''}$ be a subset of output values for which to choose a specific value $f$, such as the values related to one output slice. The computation of $u_{k'}, \ldots, u_{k''}$ involves many pairwise multiplications of the type $v_{\Omega(j,k)} \times w_{k,j}$. Each such pair is approximated in an LPA according to an embodiment by an integer value $\sigma_i$ defined by EQ. (12): $\sigma_i \equiv \lfloor 2^{\lfloor s_i/R \rfloor + \alpha} \times 2^{M + (s_i \% R)/R} \rfloor g_i$, $\alpha \equiv f - M$. According to an embodiment, a search is performed during the pairwise multiplication related to $u_{k'}, \ldots, u_{k''}$ for the largest $f$ that prevents overflow in the representation of the result $\sigma$. $f$ is initialized to a small value, such as 0, and used for the first core computation.

According to an embodiment, during each activation of the core, the magnitudes of all i unsigned integer values $|\sigma_i|$ are evaluated before the correct signs are set. If there is at least one $|\sigma_i|$ whose representation requires L−1 bits or more, then a flag named is-near-overflow that indicates an event, overflow or near overflow, is set to TRUE. Otherwise, that is, when all $|\sigma_i|$'s can be represented with fewer than L−1 bits, is-near-overflow is set to FALSE. After the core computation, the main control unit evaluates the flag is-near-overflow. If the flag is FALSE, $f$ is incremented, and if the flag is TRUE, $f$ is decremented. The new value is then used on successive core activations, which can farther modify $f$. To prevent oscillation, a second parameter $f_{max}$ is also updated online. It is initialized to a relatively high value, such as 20, so that initially $f \ll f_{max}$. During the evolution of $f$, $f_{max}$ is used as an upper bound, that is, $f$ is incremented when is-near-overflow is FALSE only as long as $f < f_{max}$. When is-near-overflow is TRUE and $f$ is decremented, $f_{max}$ is also set to the new value of $f$. This guarantees that $f$ will not grow and produce farther risk of overflow. According to an embodiment, it is assumed that one large number $|\sigma_i|$ found during the computation of the set of $u_{k'}, \ldots, u_{k''}$ is a good predictor of additional large number in the same set. However, for other sets of $u_k$ related to other output slices, the predictor may be less relevant. To allow large $f$'s for such other sets, both $f$ and $f_{max}$ are incremented once the computation of one output slice ends and the computation of another output slice begins. The flow of updates of $f$ and $f_{max}$ is described with reference to FIGS. 5A-B.

Notice that a method according to an embodiment does not guarantee that overflow is avoided. In some cases the value of $f$ that was selected based on previous $|\sigma_i|$'s, may be too large and induce overflow in successive $|\sigma_i|$'s. To reduce the risk of overflow, the is-near-overflow flag can be set if there is at least one $|\sigma_i|$ whose representation requires L−$\delta$ bits where $\delta > 1$, instead of the $\delta = 1$ case described above. The higher $\delta$ is, the lower the overflow risk will be. However, high $\delta$'s also reduce $f$ which in turn reduces accuracy. According to embodiment, it has been found that for many real NNs, choosing $\delta = 1$ or $\delta = 2$ gave most accurate results. While some overflow events did occur, the number of such events was small compared to the number of values typically accumulated during a NN computation. When an overflow even did occur, the core used the maximal absolute value that can be represented with L−1 bits, with the relevant sign, instead of the correct value $\sigma_i$.

FIGS. 5A to 5B is a flowchart of three nested loops implemented by a main control unit of an NN LPA according to an embodiment of the disclosure. Referring now to FIG. 5A, at step 501, relevant input values V needed for calculating the first output value $u_k$ for k=1, are read from the external memory, and the corresponding log domain values are stored in on-chip memory. In addition, a slice counter slc is initialized to 1, $f$ and its upper bound $f_{max}$ are initialized to predetermined values. At step 502, a subset, of indices k', ..., k'' for the $u_k$'s of the current output slice slc are selected, $f$ is incremented, and if $f > f_{max}$, then $f_{max}$ is set to $f$. At step 503, counter k is initialized to k', the first index of the selected subset of output indices.

At step 505, the subset of weights $W_k$ needed for calculating the output vector $U_k$ is read from external memory, and the log-domain values are stored in the on-chip memory. At step 507, the accumulator value ACC is initialized to zero. Next, at step 509, the pairs selection unit reads a different subset of i pairs of unprocessed weights $w_{k,j}$'s from $W_k$ and corresponding input values from the on-chip memory, and stores these values in registers of the multiplication units within the core unit.

Then, at step 511, the core unit is activated to simultaneously perform i multiplications in the log-domain, scale the results by $(f-M)$, convert the results to integers, and calculate the core result which is the integers sum of i scaled multiplication results, as shown in FIG. 4. If any of the scaled multiplication results requires L−1 or more bits, then is-near-overflow is set to TRUE, otherwise is-near-overflow is set to FALSE. The main, control unit accumulates the core results at step 513: ACC+=core result. Continuing to FIG. 5B, at step 514, the main control unit evaluates the flag is-near-overflow. If the flag is FALSE and $f < f_{max}$, $f$ is incremented, and if the flag is TRUE, $f$ is decremented and $f_{max}$ is reset to the new value of $f$.

The main control unit repeats steps 509 to 514 from step 515 until all $w_{k,j}$'s and $v_{k,j}$'s needed to calculate $u_k$ for the current subset of k's are processed. Then, at step 517, the core result is divided by $f$, the non-linear function F is applied to the result, which is then stored as in the on-chip buffer 48 of FIG. 4. If, at step 519, not all $u_k$'s have been calculated, i.e. k≠k'', k is incremented at step 521 so that the next output $u_k$ in the current slice can be processed, by going back to step 505 and repeating the process for the next output values $u_k$. If k==k'' at step 519, it is then determined at step 523 whether all slices have been calculated. If not, the slice counter slc is incremented at step 525, and steps 502 to 519 are repeated. If all slices have been calculated, the layer computation terminates, and the output is written through the bus to the external memory Effects According to embodiments, accelerating neural network computations using low-power hardware is useful for continuous or massive activation of neural-network based applications on mobile phones, tablets, smart cameras, laptops, virtual, and augmented reality devices, and any other device with limited electrical power resources.

Relevant NN-based and CNN-based applications include, among others:
- Image and video processing, such as denoising, demosaicing, deblurring, sharpening, super-resolution (smart upscale), reeoloring, disparity/depth extraction from stereo vision, etc.;
- Image, video and scene understanding such as: recognition, classification and segmentation of objects, people, faces, vehicles; interpretation of relations between entities In scenes; recognition of facial emotions and expression and eye tracking; human body and hand pose estimation, hand gestures and human action recognition; and
- Language related application such as: handwriting recognition, speech recognition, speech synthesis, machine translation, speech based man-machine interaction and conversation.

The automotive industry uses many applications based on neural network models, including driver assist and alert applications, automatic lane and distance control up to fully automatic driving, speech and gesture based interaction between the driver and the car system, etc. Video streams from many cameras, lidars and other sensors mounted on a car can be analyzed either with dedicated circuits that are part of each sensor, or by a central computation device that processes and integrates all visuals and signals. Such analysis is typically based on neural network models, and embodiments of the disclosure can be used to reduce overall electrical power consumption in a car.

In addition, low-power, dedicated acceleration of neural network computations according to embodiments can become a major factor on non-portable home computers, and also when running multiple instances of neural network models on servers. In general, such acceleration can contribute to all devices that use neural network models as a primary computation model, in cases where the overall consumed computation power becomes significant in terms of expenses and environmental considerations and in systems where cooling becomes a challenge.

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangible embodied on a computer readable program storage device. The application program can be uploaded to, and executed by, a machine comprising any suitable architecture.

Figure 6:
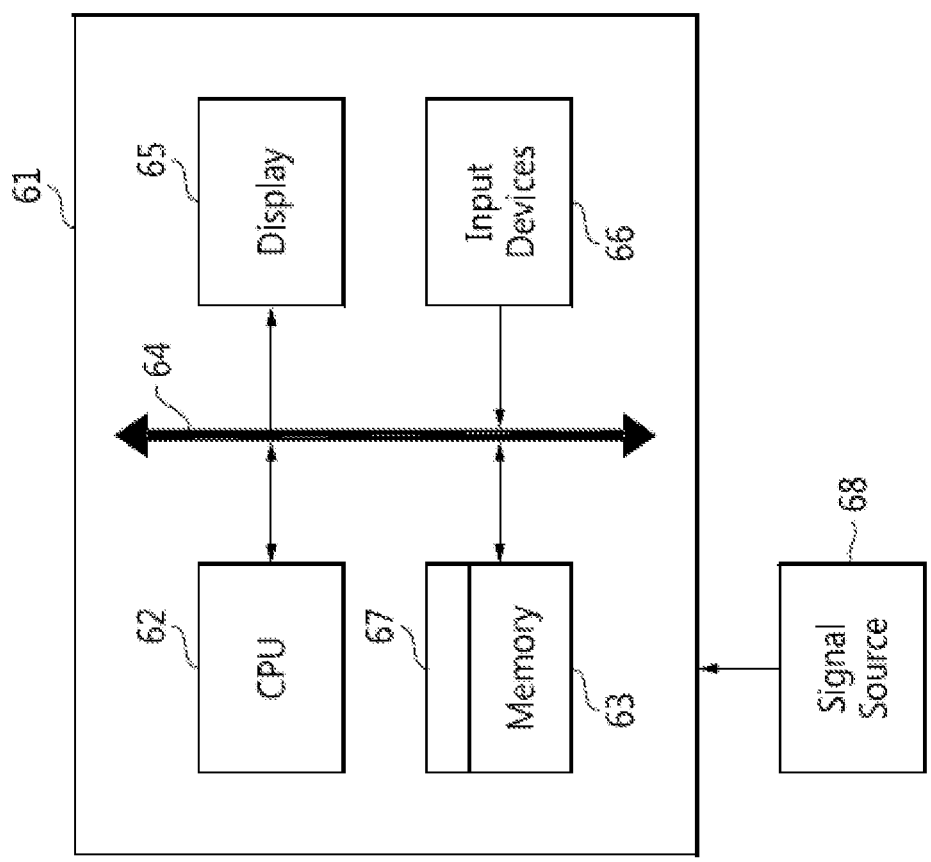
FIG. 6 is a block diagram of a system that implements a method for accelerating the central computation of a convolutional neural network mathematical model, according to an embodiment of the disclosure.

FIG. 6 is a block diagram of a system that implements a method for accelerating the central computation of a convolutional neural network mathematical model while consuming low power and maintaining the required precision, according to an embodiment of the disclosure. Referring now to FIG. 6, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present disclosure can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention. Alternatively, as described above, embodiments of the present disclosure can be implemented as an ASIC or FPGA. 67 that is in signal communication with the CPU 62 to process the signal from the signal source 68.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:
1. A method of processing a layer in a convolutional neural network, comprising the steps of:
   reading a plurality of different subsets of pairs of input vector values and corresponding, weight vector values from an on-chip memory, and storing the pair values in registers of a plurality of multiplication units;
   simultaneously processing, for each different subset, the pairs of values in the registers by multiplying the pairs of values and accumulating the results of the multiplications to obtain an output vector for a current layer,
   wherein the input vector and the weight vector have floating point values and multiplying the pairs of values comprises adding corresponding pairs of integers in a log domain,
   wherein a base of the log domain is $2^{(1/(2^N))}$, wherein N is a positive integer,
   wherein, an input value or weight value is released from the on-chip memory after said input value or weight value is no longer needed for calculating non-computed output vector values; and
   for each layer of the convolutional neural network:
      storing log domain values of the input vector in the on-chip memory;
      storing log-domain values of the weight vector in the on-chip memory;
      converting the integer addition results back to a linear domain, before accumulating the multiplication results; and
      outputting the output vector for the layer from the on-chip memory to an external memory.

2. The method of claim 1, wherein multiplying the pairs of values by adding corresponding pairs of integers in a log domain comprises:
- calculating $y = \lfloor s/R \rfloor$ wherein $R = 2^N$ and s is sum of a corresponding pairs of integers by right shifting s by N bit;
- calculating s % R by extracting die N least significant bits of s, wherein s % R is in a range [0, R−1];
- mapping, s % R to a positive number x in a range [1, 2) using a look-up-table; and
- left shifting x by y bits to calculate $2^{\lfloor s/R \rfloor} \times 2^{(s \% R)/R}$.

3. The method of claim 1, wherein calculating a multiply-and-accumulate operation, comprises calculating, for a $u_k$ for some k, $c_{d,k} = \Sigma_{j \in \Psi(d,k)} v_{\Omega(j,k)} \times w_{k,j}$,
- wherein $u_k$ is the output vector, $v_j$ is an input vector and $w_{k,j}$ is a corresponding weight,
- wherein $\Psi(d, k)$ is a set of i indices selected for iteration d of calculating $u_k$, and that the union over all iterations d is simply the entire set of indices 1, . . . , J, and $\Omega(j, k)$ is a subset of the input indices $\Omega(l, k), \ldots, \Omega(j, k)$ used for calculating each output value $u_k$,
- and accumulating results of the multiply-and-accumulate operation comprises calculating $u_k = \Sigma_{j=1,\ldots,J} v_j \times w_{k,j} = \Sigma_d \Sigma_{j \in \Psi(d,k)} v_{\Omega(j,k)} \times w_{k,j} = \Sigma_d c_{d,k}$.

4. The method of claim 1, further comprising:
- initializing f and $f_{max}$ to predetermined values, wherein f and $f_{max}$ are integers, and the predetermined value of $f_{max}$ is larger than the redetermined value of f;
- incrementing f;
- setting f to $f_{max}$, if $f > f_{max}$;
- scaling the multiplication result by (f−M), wherein M is a number of fractional bits in the multiplication result;
- setting a is-near-overflow condition to TRUE, when a scaled multiplication result requires L−1 or more bits, otherwise setting the is-near-overflow condition to FALSE, wherein L is an integer word size of an addition unit; and
- incrementing f, when the is-near-overflow condition is FALSE and f<fmax, and decrementing f and setting fmax to the new value of f, when the is-near-overflow condition is TRUE.

5. The method of claim 4, further comprising dividing the output vector $u_k$ by $f$.

6. The method of claim 1, further comprising applying a non-linear function F to the accumulated results of the multiplications, and saving the result as the output vector in an on-chip buffer.

7. A digital circuit for accelerating computations in a convolutional neural network, comprising:
- an external memory that stores an input vector, a weight vector, and an output vector; and
- a control unit, wherein the control unit comprises:
  - an on-chip memory that stores log-domain values of the input vector and weight matrix to be processed;
  - a pairs selection unit that selects a plurality of different subsets of pairs of log-domain input vector values and corresponding unprocessed log-domain weight vector values from the on-chip memory, and stores the pair values in a plurality of pairs of registers; and
  - a core unit that includes a plurality of sub-units wherein each sub-unit performs a multiply-and-accumulate operation on the pair values in one pair of registers wherein multiplying the pairs of values comprises adding corresponding pairs of integers in a log domain;
  - wherein the core unit simultaneously calculates, for each different subset, partial sums of z output values, wherein z is less than a total number of values of the output vector, wherein each partial sum includes a subset of linear domain multiplication results, and the control unit accumulates the partial sums into z corresponding registers associated with z output values,
- wherein each subunit comprises a multiplier that comprises
  - an adder that calculates and outputs s=v'+w', where v' is a log-domain input value $v_{\Omega(j,k)}$ and w' is a log-domain weight value $w_{k,j}$,
  - a shift register calculates $\lfloor s/R \rfloor$ by right shifting s by N bits, wherein $\lambda = 2^{1/R}$ is a base of the log domain and $R = 2^N$;
  - an extraction unit that calculates p=s % R by extracting the N least significant bits of s;
  - a LUT that maps p into a positive number and calculates $x = 2^{(M+p/R)}$,
  - wherein x is an unsigned integer of the form 1+M bits;
  - a subtractor that calculates $y = \lfloor s/R \rfloor - M$; and
  - a shift register that left shifts x by v bits, and outputs a result $v \times w \cong 2^{\lfloor s/R \rfloor} \times 2^{\lfloor (s \% R)/R \rfloor}$.

8. The digital circuit of claim 7, further comprising:
- an accumulator that accumulates results of the multiply-and-accumulate operations for the different subset of pairs of input vector values and corresponding unprocessed weight vector values;
- a register that stores a result accumulated by the adder;
- a functional unit that applies a non-linear function to the result accumulated by the adder to calculate an output value; and
- an on-chip buffer that stores the output values.

9. The digital circuit of claim 7, wherein each pair of registers respectively holds $v_{\Omega(j,k)}$ and $w_{k,j}$, respectively, wherein input value $v_{\Omega(j,k)}$ is an element of an input vector with J elements, and $w_{k,j}$ is an element of a kth column vector of a K×J weight matrix, and $\Omega(j,k)$ is a subset of the input indices $\Omega(l, k), \ldots, \Omega(j, k)$, and wherein each subunit further comprises
- an adder that accumulates products of the subunits,
- wherein a number of subunits i is less than the number of input values J.

10. The digital circuit of claim 9, wherein the core unit further comprises:
- a first maximization unit that takes as input all i outputs $\lfloor s_i/R \rfloor$ of the shift register of the multiplication units and calculates $q = \max_i \lfloor s_i/R \rfloor$;
- a second maximization unit that calculates $f = L - 2 - q - \delta$ and $\alpha = f - M$, wherein L is an integer word size of the adder, δ is a user defined constant that determines the effective number of hits in the adder, $f$ is a predetermined integer of order O(10), and provides the output a as input to the subtractor of each multiplication unit;
- a sign extraction unit that extracts a sign $g_i$ of a multiplier result $v_{\Omega(j,k)} \times w_{k,j}$ and outputs a result $\sigma_i = v_i \times w_i \times g_i \times 2^f$ to the adder; and
- a shifter that divides the accumulated products received from the adder by $2^f$.

11. The digital circuit of claim 10, further comprising a floating point conversion unit that converts accumulated products received from the adder into a floating point representation.

12. The digital circuit of claim 10, wherein L is predetermined to tradeoff accuracy and power usage of the digital circuit.

13. The digital circuit of claim 7, Wherein the external memory stores log-domain values of the weight matrix, and wherein the control unit comprises a log convertor unit that converts a linear-domain input vector value into the log domain before the input vector value is stored in the on-chip memory.

14. A digital circuit for accelerating computations in a convolutional neural network, comprising:
a plurality of sub-units that include at least one look-up-table (LUT), wherein each sub-unit performs a multiply-and-accumulate operation on a pair of input values by using the at least one LUT that maps an integer p into a positive number that approximates $x=2^{\wedge}(M+p/R)$, wherein x is an unsigned integer of the form 1+M bits, wherein p, R, and M are integers, and $R=2^N$ for some integer N.

15. The digital circuit of claim 14, wherein each subunit comprises:
a pair of registers that respectively holds a log-domain input value $v_{\Omega(j,k)}$ and a log-domain weight value $w_{k,f}$, respectively, wherein input value $v_{\Omega(j,k)}$ is an element of an input vector with J elements, and $w_{k,f}$ is an element of a kth column vector of a K×J weight matrix, and $\Omega(j,k)$ is a subset of the input indices $\Omega(1, k), \ldots, \Omega(j, k)$,
a multiplier that calculates $v_{\Omega(j,k)} \times w_{k,f}$;
an adder that accumulates products of the subunits; and
a sign extraction unit that extracts a sign $g_i$ of a multiplier result $v_{\Omega(j,k)} \times w_{k,f}$ and outputs a result $\sigma_i = v_i \times w_i \times g_i \times 2^{\wedge}f$ to the adder,
wherein a number of subunits i is less than the number of input values J.

* * * * *